No. 872,269. PATENTED NOV. 26, 1907.
O. WILLIAMS.
GEARING.
APPLICATION FILED JAN. 30, 1907.

Witnesses
Arlita Adams
Edward W. Cresman.

Inventor
Oscar Williams
By Adams & Brooks
Attorneys

UNITED STATES PATENT OFFICE.

OSCAR WILLIAMS, OF CHARLESTON, WASHINGTON.

GEARING.

No. 872,269.          Specification of Letters Patent.          Patented Nov. 26, 1907.

Application filed January 30, 1907. Serial No. 354,934.

*To all whom it may concern:*

Be it known that I, OSCAR WILLIAMS, a citizen of the United States of America, and a resident of the town of Charleston, in the county of Kitsap and State of Washington, have invented certain new and useful Improvements in Gearing, of which the following is a specification.

The primary object of my invention is the provision of an improved construction adapted to be mounted on a car axle of the type composed of two sections to allow for compensation for the difference in length of travel of the respective car wheels around curves in the track, through the medium of which power from a motor or the like can be transmitted to both axle sections.

Other objects will be set forth as the description progresses and those features of construction in which the invention resides succinctly defined in the appended claims.

Figure 1:
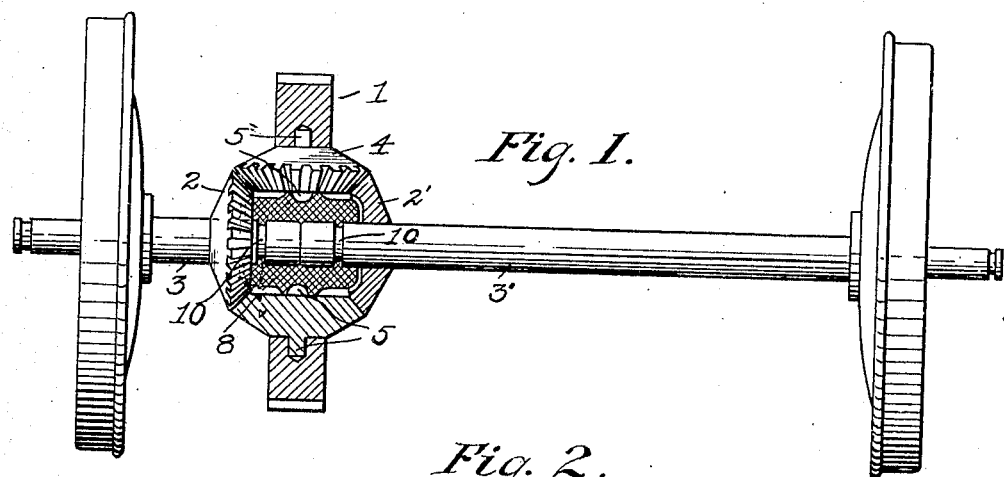
Figure 2:
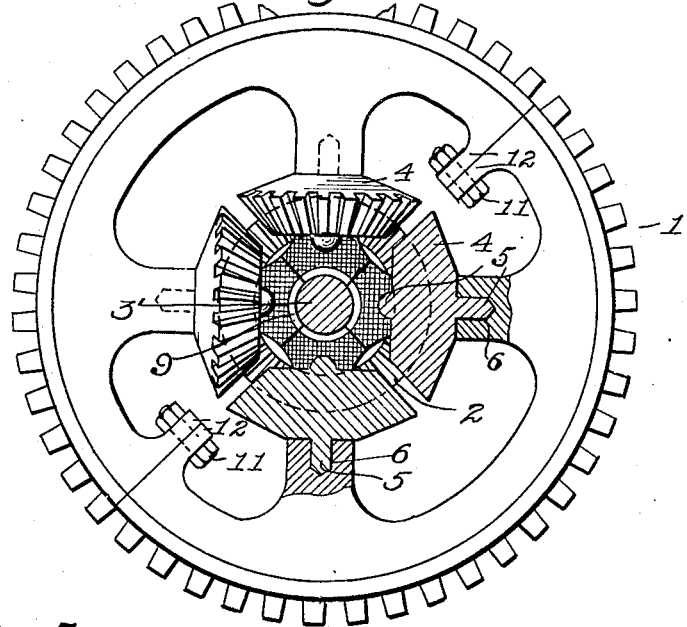
Figure 3:
Figure 4:
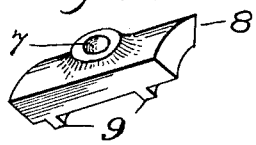

Referring now to the accompanying drawing, in which like numerals of reference indicate like parts throughout the several views: Figure 1 is an elevation of a car axle, and the usual wheels thereof, provided with my invention, parts of which are shown in section. Fig. 2 is a vertical cross section through the car axle and the sleeve thereon. Fig. 3 is a view in perspective of one of the sleeve sections inverted to show the construction of the inner face thereof, and Fig. 4 is a perspective view of said sleeve section, showing more particularly the outer surface thereof.

My improvement is particularly adapted for use in connection with the axles of cars driven by electricity, and consists of a toothed wheel 1 to which power from a motor (not shown) is transmitted as by a chain or a gear on the shaft of the motor, as is obvious.

Reference numerals 2, 2' indicate bevel gears on the contiguous end portions of axle sections 3, 3', which are in mesh with bevel gears 4, supported for rotation in the toothed wheel 1. Bevel gears 4, as now considered, are provided with opposite journal pins 5, one of which is rotatably supported in a bearing as 6, of wheel 1, and the other in a bearing 7 of sleeve 8, which sleeve receives the contiguous end portions of the respective car axle sections.

Ribs 9 formed on the inner face of sleeve 8 and engaging in grooves 10 of the axle sections, hold said axle sections in their proper relative positions. As now considered, sleeve 8 is formed in four sections each of which is provided with a bearing 7. Toothed wheel 1 is also formed in sections, as clearly shown in Fig. 2 to permit of the proper positioning of gears 4 therein, which sections are secured together by bolts, as 11, passing through flanges 12 thereof.

The construction of sleeve 8 and toothed wheel 1 can be readily varied without departing from the spirit of my invention, as defined in the claims hereto appended.

In operation, when wheel 1 is rotated, both axle sections are held to movement therewith by the gears 4 meshing with both gears 2, 2', but when the cars strike a curve, that wheel on the outer or longer arc of the curve will run independently of the toothed wheel 1, there being the least resistance between this wheel and its rail, and operate gears 4 so as to rotate the gear wheel on the opposite axle section in a reverse direction, thereby compensating for the difference in length of the arcs of the curve traversed by the wheels.

Having thus fully described my invention, what I claim as new and desire to secure by Letters Patent of the United States, is:—

1. An axle formed in two sections having circumferential grooves in their contiguous end portions, a sleeve receiving the inner end portions of said axle sections and having ribs engaging in the grooves thereof, said sleeve being formed in longitudinal sections each of which is formed in its exterior surface with a bearing, a drive wheel, gears having opposite journal pins one of which is journaled in said drive wheel and the other in a bearing of said sleeve, and a gear on each of axle sections meshing with all of said first gears.

2. An axle formed of two sections arranged end to end, a drive wheel formed in two sections having flanges on their contiguous portions, means engaging the flanges of said wheel sections for securing the same together, a sleeve receiving the contiguous end portions of said axle sections, a gear on each of the axle sections, and gears meshing with said first named gear having opposite journal pins one of which is journaled in said drive wheel and the other in said sleeve.

Signed at Seattle, Washington this 18th day of January 1907.

OSCAR WILLIAMS.

Witnesses:
    F. J. FOSTER,
    STEPHEN A. BROOKS.